United States Patent [19]

Harant

[11] 4,149,416
[45] Apr. 17, 1979

[54] BALANCING MACHINE SPINDLE MOUNTING

[75] Inventor: Gerhart W. Harant, Blackburn, Australia

[73] Assignee: Repco Limited, Melbourne, Australia

[21] Appl. No.: 832,467

[22] Filed: Sep. 12, 1977

[30] Foreign Application Priority Data

Sep. 27, 1976 [AU] Australia ............................ PC7519

[51] Int. Cl.² .............................................. G01M 1/22
[52] U.S. Cl. ........................................ 73/462; 73/477
[58] Field of Search .................. 73/460, 462, 471–479

[56] References Cited

U.S. PATENT DOCUMENTS

| | | | |
|---|---|---|---|
| 3,252,332 | 5/1966 | Senger | 73/471 |
| 3,636,773 | 1/1972 | Harant | 73/475 X |
| 3,910,121 | 10/1975 | Curchod et al. | 73/462 |

*Primary Examiner*—James J. Gill
*Attorney, Agent, or Firm*—Stevens, Davis, Miller & Mosher

[57] ABSTRACT

A spindle mounting for a wheel balancing machine of the kind in which the spindle is arranged substantially horizontal and has a cantilevered end portion for receiving a wheel to be balanced. The mounting includes a housing for rotatably supporting the spindle, and flexible support means connecting that housing to a base which is securable to a frame of the balancing machine. The support means includes at least three elongate support members which extend transverse to the spindle axis and are arranged in spaced side by side relationship, and an elongate restraining member arranged substantially parallel to the spindle. The support members are connected between the housing and base to provide column supports for the housing, and the restraining member has its opposite end portions connected to the housing and base respectively to hold the housing against endwise movement relative to the base. Each support member and the restraining member has sufficiently low lateral stiffness to permit relatively free lateral movement of the housing relative to the base in a plane extending transverse to the support members. A pair of force transducers are secured to the base and are connected to the housing through elongate reactor members so as to respond to lateral movement of the housing by generating a signal characteristic of the force causing that movement, and each reactor member is elongate and has sufficiently low lateral stiffness to substantially limit the transducer response to those forces acting in the aforementioned plane laterally of the spindle.

17 Claims, 9 Drawing Figures

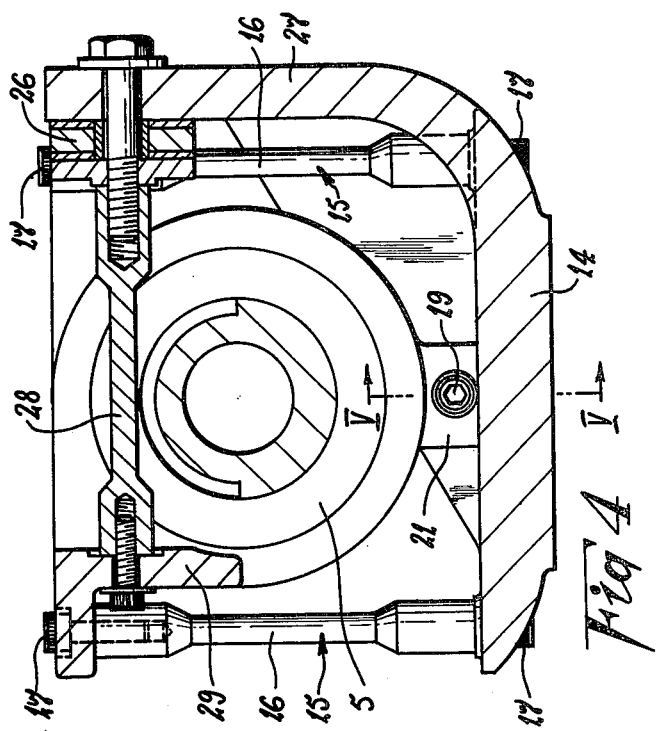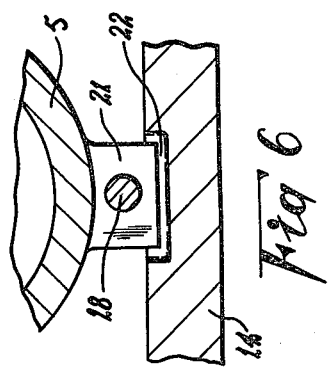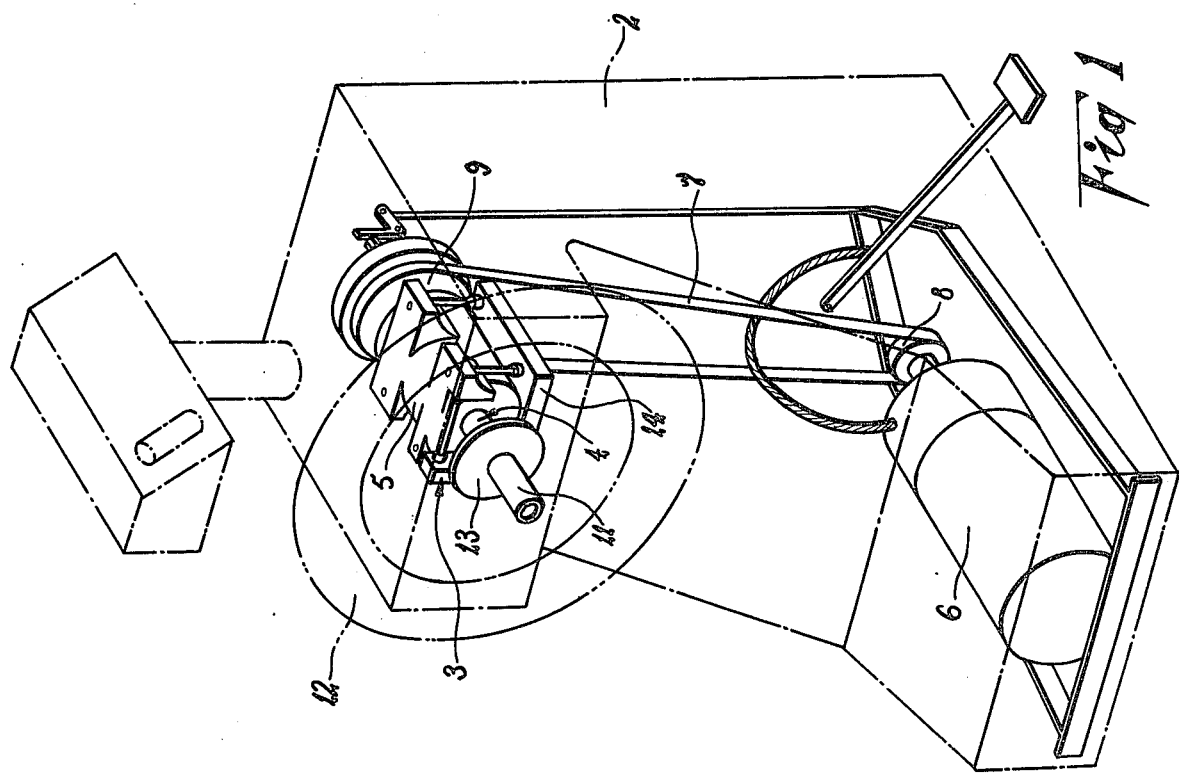

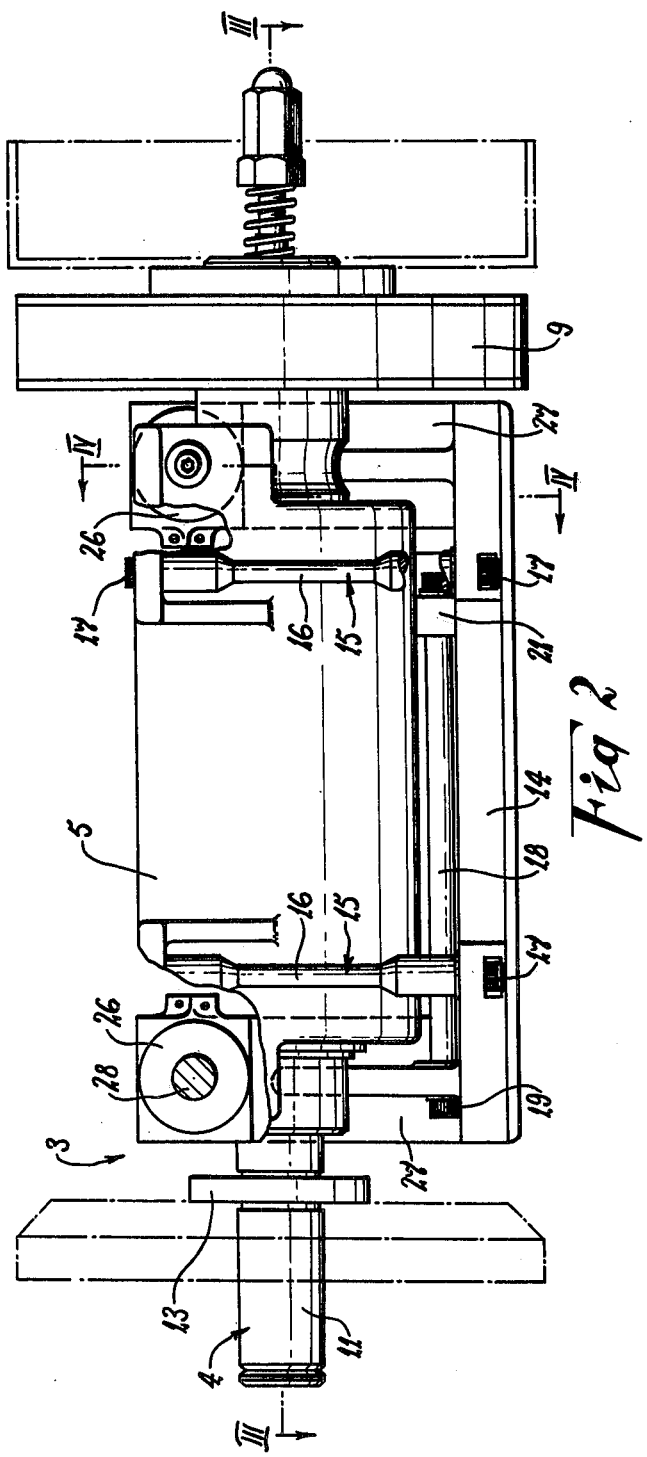

BALANCING MACHINE SPINDLE MOUNTING

This invention relates to balancing machines of the kind having a rotatable spindle adapted to receive and rotate the workpiece to be balanced, and is primarily concerned with the mounting of such spindles. It will be convenient to hereinafter describe the invention with reference to wheel balancing, which is a particular use of balancing machines of the kind indicated.

Most balancing machines rely on rotating the workpiece to be tested in order to create either periodic displacement of the spindle (in a low tuned or "soft bearing" machine) or forces reacting into the body of the machine (in a high tuned or "rigid bearing" machine). These displacements or forces are then analysed by various means to derive the amount and position of the required correction either in a single plane (static balance) or two planes (dynamic balance).

In the machines of the rigid bearing type, it has become common to react the forces to be measured into the frame of the machine directly via force transducers which are generally of the piezo-electric kind and the invention relates to machines of this type or more particularly to a spindle mounting for such machines.

Reduction of rotational operation speeds of machines which are used for balancing rigid rotors is obviously highly desirable. Lower speeds means smaller and lighter drives, less windage, less mechanical noise etc. However, centrifugal force due to imbalance drops as the square of the reduction in speed. Suspension systems have to be designed to react the bulk of such forces into the transducers, whilst excluding as far as possible other forces, in particular those which recur with every revolution of the spindle but are not related to unbalance. These include the following:

1. Torsional forces which recur cyclically with each revolution due to bearing inaccuracies.
2. Forces due to variation in drive belt tension caused by drive pulley eccentricity.
3. Moments generated by bearing misalignment. In addition to the need for exclusions of these error-producing unwanted elements, it is of importance for several reasons to react the bulk of the wanted signals into the transducers.
4. As the absolute amount of reacted force decreases due to reduced running speed, the relative value of available signal becomes more important.
5. As is well known, noise produced in electronic circuits is inversely proportional to frequency, and very low frequency amplifiers therefore require more signal to remain above the noise level.
6. If a substantial part of the force is reacted into structural members other than via the transducer, any change in rigidity of these members produces changes in sensitivity. As the computation of actual out-of-balance vectors frequently involves small differences between relatively large transducer signals, a minor change in sensitivity of any one transducer may produce relatively large errors in readings.
7. If additional stiff members are introduced as mentioned in 6 above, the reaction points will not be clearly defined as the moment of the force in each unbalance plane will not be taken about each transducer attachment point on the spindle, but about points along the spindle defined by the totality of members contributing to this stiffness.

The resulting effective reaction point will not only not coincide with the transducer attachment point, but may vary from machine to machine due to production variations. This brings about errors in the analogues which are used to process the signals derived from the transducers.

All these factors are well known to those skilled in the art, and numerous solutions exist to deal with the problems mentioned above. These solutions generally apply to machines capable of handling a variety of workpieces.

Special conditions exist in the case of machines specifically designed to balance workpieces mounted on a cantilevered spindle. Typical of these machines are vertical balancers and balancers for motor vehicle wheels. The invention relates to machines of this general type, and the invention will be hereinafter described with specific reference to machines for balancing motor vehicle wheels, in which the spindle axis lies in a horizontal plane. It is to be understood however, that the invention can be applied to any balancing machine using a cantilevered spindle.

In machines of the foregoing general type, one common approach is to support the spindle by cantilever members which are in pairs, each pair situated at or near one bearing plane with a support member either side of the spindle. Such supports are generally rectangular in section, to provide a measure of axial stiffness to the spindle. Any such pair of supports acts substantially as a parallel guide for the spindle. As the ends of the spindle must be allowed to move transversely independently from one another, so that each of the two reaction points is sharply defined, an additional rotary degree of freedom has to be provided whenever this form of suspension is used.

Attempts have been made to use the bearings themselves as means for allowing this rotary degree of freedom. This solution is unsatisfactory, because the antifriction bearings which are generally used for this purpose cannot be made to run true in the axial plane. Any runout of this nature however, expresses itself as a moment of one bearing about the other, with a cyclic variation as the shaft rotates. This variation is interpreted by the machine as an unbalance. The spindle bearings therefore must be mechanically joined by a housing or members into which the irregularities of the bearings can be reacted.

One quite different arrangement uses a spindle housing having two relatively heavy and long circular section supporting vertical members attached to a base, with a seismic pick-up or accelerometer on each member. Apart from the bulky nature of such a system, it cannot be said to provide a high degree of torsional freedom in the axial plane and the effective reaction points therefore lie not at the centre of the supporting members but at some points between the two members. Also, torsional forces occurring in the spindle housing due to shaft rotation produce a bending moment in the shaft which will, if it varies during each revolution, produce an error signal.

It is a principal object of the present invention to provide a balancing machine spindle mounting which is of relatively simple and inexpensive construction, and which enables detection of the bulk of the actual out of balance forces of an associated workpiece to the substantial exclusion of other error producing forces. A further object of the invention is to provide a spindle mounting of the foregoing kind which permits lateral floating movement of the spindle in a plane containing the spindle axis, but which substantially prevents endwise movement of the spindle and movement of the spindle transverse to the aforementioned plane.

Still another object of the invention is to provide a spindle mounting for a horizontally disposed spindle, which enables freedom of lateral movement of the spindle in a horizontal plane whilst providing rigidity in the vertical direction and resistance to torsion in the spindle housing. Yet another object of the invention is to provide a balancing machine of the kind indicated including the foregoing spindle mounting.

According to one aspect of the invention there is provided a balancing machine spindle mounting including: a housing; a spindle rotatably mounted on said housing and having a cantilevered end portion projecting beyond said housing to receive a workpiece to be balanced; a support base; and flexible support means connecting said housing and base and including, at least three elongate support members which extend transverse to the axis of said spindle and are arranged in spaced side by side relationship, said support members being connected between said housing and base to provide column supports for said housing, and each said support member has sufficiently low lateral stiffness to permit relatively free lateral movement of said housing relative to said base in a plane extending transverse to said support members.

According to a further aspect of the invention there is provided a balancing machine including; a main frame; a spindle housing connected to said main frame through flexible support means; a spindle rotatably mounted on said housing and having a cantilevered end portion projecting beyond said housing to receive a workpiece to be balanced; drive means connected to said spindle and being operative to cause rotation thereof; and transducer means secured to said main frame and being responsive to movement of said housing relative to said frame to generate a signal characteristic of the force causing such movement; said flexible support means including at least three elongate support members which extend transverse to the axis of said spindle and are arranged in spaced side by side relationship, said support members being connected between said housing and main frame to provide column supports for said housing, and each said support member has sufficiently low lateral stiffness to permit relatively free lateral movement of said housing relative to said main frame in a plane extending transverse to said support members.

The expression "side by side relationship" as used in the preceding two paragraphs and subsequently throughout this specification, is not to be interpreted as requiring the support members to be in alignment, nor does it require them to be strictly parallel. It will be understood that, in order for the support members to function as column supports for the housing, at least one member will not be in alignment with the others, so that if there are three support members each will be located at a respective corner of an imaginary triangle. As to parallelism of the support members, that is generally preferred, but is not essential. Furthermore, the expression "low lateral stiffness" as used in the preceding two paragraphs and as appearing in the same context in subsequent passages of this specification, refers to the relationship between lateral stiffness of the column supports and the stiffness of the transducer supports. That is, the lateral stiffness of the column supports is relatively low compared to the stiffness of the transducer supports so that a very large proportion of the horizontal forces imparted to the spindle housing by imbalance of a workpiece, can be reacted into the transducers.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

In the drawings:

FIG. 1 is a semi-diagrammatic perspective view showing a typical balancing machine incorporating an example spindle mounting according to the invention;

FIG. 2 is a side elevational view, on an enlarged scale, of the spindle mounting shown in FIG. 1;

FIG. 4 is a cross-sectional view along line IV—IV of FIG. 2;

FIG. 6 is a cross-sectional view along line VI—VI of FIG. 5;

Figure 3:
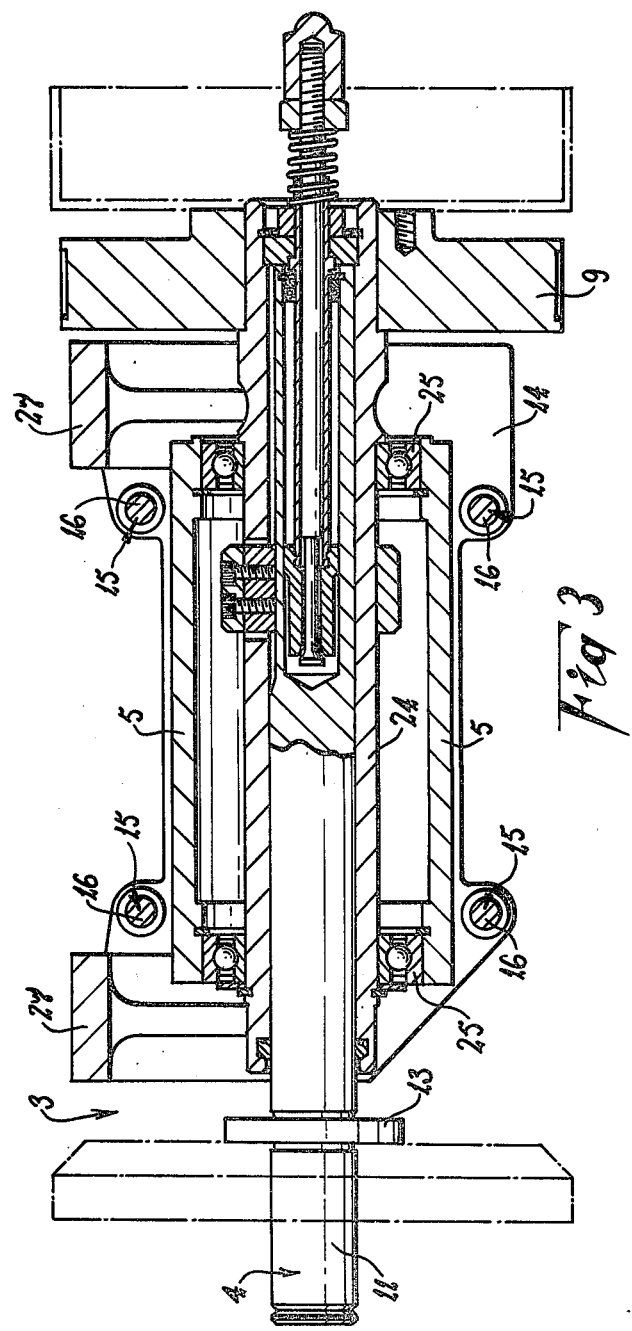
FIG. 3 is a cross-sectional view along line III—III of FIG. 2.

A typical balancing machine to which the invention can be applied is shown in FIG. 1, and includes a main frame 1 and a spindle mounting 3 connected to that frame. The spindle 4 is rotatably mounted in a housing 5 of the mounting 3 and which is connected to the frame 2 through flexible support means hereinafter described. Rotation of the spindle 4 is effected through a drive motor 6 and belt 7 engaging pulleys 8 and 9 on the motor 6 and spindle 4 respectively. A cantilevered end portion 11 of the spindle 4 projects beyond one end of the housing 5 to receive a wheel 12 to be balanced, and any appropriate means 13 may be provided to releasably secure the wheel 12 in position.

Referring now to FIGS. 2 to 7, the housing 5 is connected to a base 14 through the flexible support means which includes four support members 15 arranged to act as column supports for the housing 5. It will be appreciated however, that the base 14 may be omitted in some circumstances so that the housing 5 is connected directly to the frame 2 through the flexible support means. Each support 15 is relatively long and slender so as to have lateral flexibility, but is so shaped and dimensioned to resist buckling. That is, each support 15 has high strength in tension and compression, but low resistance to bending. As a result, the housing 5 is suspended by the flexible support means for floating movement in a horizontal plane.

Although four supports 15 are shown, three may be adequate, or a number greater than four may be used. Preferably, as shown, each support 15 is of circular cross-section and has a portion 16 of reduced diameter intermediate its ends, and the portion 16 constitutes a substantial part of the length of the supports 15. The larger end portions of each support 15 are connected to the housing 5 and base 14 respectively through fastening screws 17, but other means of attaching may be used.

In the particular construction shown, the supports 15 are arranged in pairs, each of which is located adjacent a respective end of the housing 5, and the supports 15 of each pair are located at opposite sides of the housing 5 at substantially equal distances from the axis of the spindle 4. It is possible however, to achieve satisfactory results without having the supports 15 arranged symmetrical as described and shown. Also, the supports 15 are of equal length in the construction shown, and whilst that is preferred, satisfactory results could be obtained in other arrangements provided all supports 15 have substantially the same resistance to bending between their points of attachment with the housing 5 and base 14.

Figure 5:
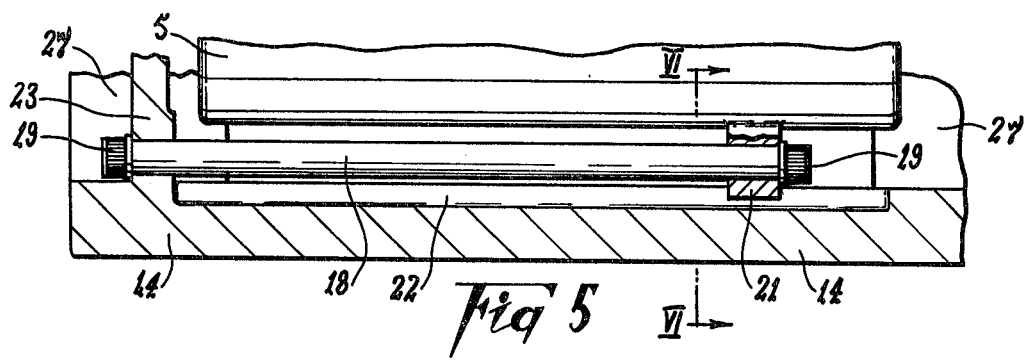
FIG. 5 is a cross-sectional view along line V—V of FIG. 4.
Figure 7:
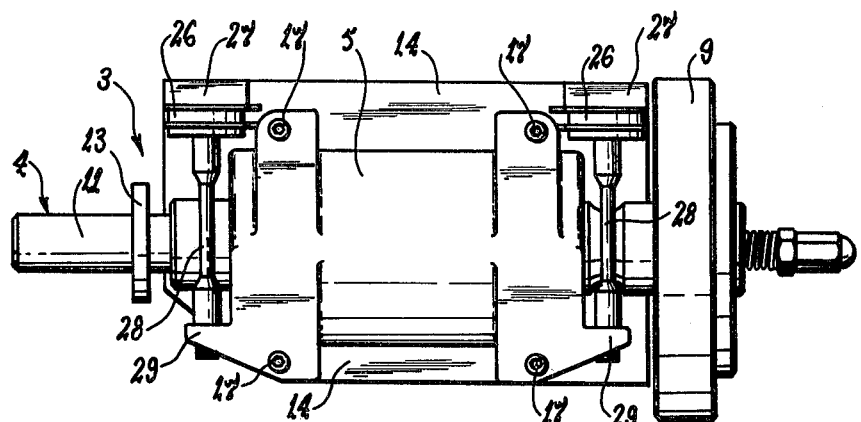
FIG. 7 is a plan view of the spindle mounting shown in FIG. 2.

Restraining means is provided, in the construction shown, to hold the housing 5 against movement relative to the base 14 in the axial direction of the spindle 4. In the construction shown, that means is in the form of a relatively long and slender member or rod 18 having its opposite ends connected to the base 14 and housing 5 respectively, through fastening screws 19. The rod 18 has sufficiently low lateral stiffness to permit relatively free lateral movement of the housing 5 relative to the base 14 in the aforementioned horizontal plane, and consequently creates axial rigidity in the housing mounting whilst maintaining transverse freedom. The rod 18 is shown as located directly below the spindle 4 with its axis substantially midway between the supports 15 at each end of the housing 5 (see FIG. 4), but other locations are possible. FIGS. 5 and 6 show a particular connection between the rod 18 and housing 5 in which one end of the rod 18 is secured to a lug 21 projecting beneath the housing 5 and which is partially located within a recess 22 of the base 14. The opposite end of the rod 18 is connected to a lug 23 projecting upwardly from the base 14, as is shown also in FIG. 5. The recess 22 and lug 21 are relatively dimensioned so as to retain the necessary freedom of movement for the housing 5.

Turning now to FIG. 3, that shows a particular rotational mounting for the spindle 4 in which a sleeve 24 contains a substantial part of the spindle 4, and suitable bearings 25 are located around the sleeve 24 at two positions spaced in the axial direction of that sleeve. The bearings 25 are contained in respective opposite ends of the housing 5 and are rigidly connected by that housing. Furthermore, the sleeve 24 is a neat fit over the spindle 4, at least in the region of each bearing 25.

Two transducers 26 of a known kind—e.g. piezoelectric—are located to one side of the housing 5, and in the construction shown, each is rigidly connected to the base 14 through a respective bracket 27. The transducers 26 operate in a known manner to generate an electrical signal in response to mechanical strain, and the magnitude of the signal varies according to the magnitude of the strain. That effect, and the manner in which it is applied to obtain a read-out in wheel balancers, is well known, and will not be described further in this specification.

As shown, each transducer 26 is preferably adjacent a respective one of the bearings 25 and is located to one side of the housing 5. Each transducer 26 is mounted on the base 14 so that forces in the horizontal plane transverse to the spindle 4 are reacted into it by a relatively long and slender reactor member 28. The reactor members 28 have sufficiently low lateral stiffness to isolate any error forces that may be present due to deflection of the supports 15 or torsion applied to the housing 5. Since the brackets 27 connecting the transducers 26 to the base 14 are relatively rigid, a very large proportion (e.g. 95% or more) of the horizontal forces imparted to the housing 5 by imbalance of a wheel 12, can be reacted into the transducers 26 through the members 28.

Figure 8:
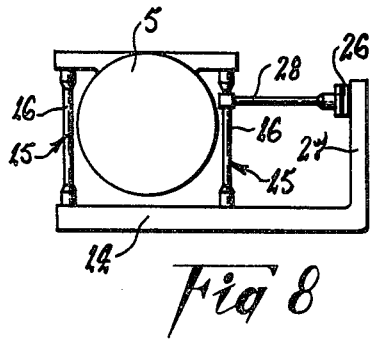
FIG. 8 is a semi-diagrammatic view showing an alternative connection between the spindle housing and transducers.

In the construction shown in FIGS. 2 to 7, each reactor member 28 is connected to its respective transducer 26 at one end, and is connected to a lug 29 of the housing 5 at its opposite end. The lugs 29 are located on the side of the housing 5 remote from the transducers 26, so resulting in a relatively compact arrangement. It is not necessary however, to connect the reactor members 28 direct to the housing 5, and an alternative possibility is shown in FIG. 8 in which each member 28 is connected to the housing 5 through a respective one of the supports 15.

Although the preceding description relates specifically to balancing machines having a horizontal spindle, it is to be understood that applicability of the invention is not limited to such machines.

It will be appreciated from the foregoing description that the invention provides a greatly improved spindle mounting for a balancing machine. Since the transducers are rigidly supported, whereas the spindle is able to float in a predetermined plane, a large proportion of the forces acting in that plane can be reacted into the transducers. The nature of the means for transmitting the forces to the transducers, contributes to achievement of accurate determination of out of balance in a workpiece.

In the construction particularly described, it is preferred that the point of attachment of each vertical support with the spindle assembly, lies in a substantially horizontal plane, which may or may not contain the spindle axis. That relationship is not essential however, nor is it essential that the vertical supports be of the same length although uniformity of length is generally preferred. Still further, the preferred number of three supports has been selected as the lowest number which will conveniently resist torsion in the spindle, and obviously any greater number may be chosen whilst maintaining the same advantage of torsion resistance. It has been found that a circular cross-section is satisfactory for the supports because of the high compression strength and relatively low bending resistance of such a section, but once again that is not essential.

Figure 9:
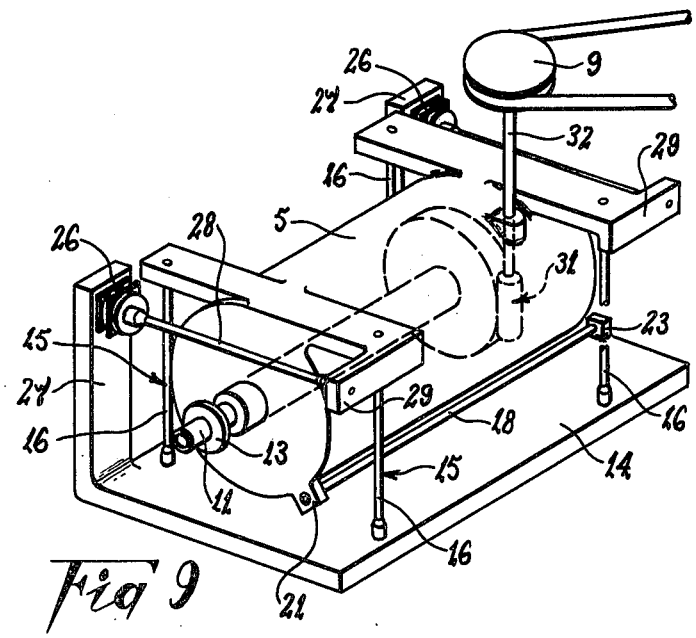
FIG. 9 is a perspective diagrammatic view of an alternative embodiment of the invention.

In an alternative embodiment of the invention as shown in FIG. 9, the spindle 11 is driven through a worm and worm wheel arrangement 31, and the pulley 9 is therefore connected to a vertical shaft 32 rather than directly to the spindle 11 as in the prior construction. A further change is that the restraining rod 18 is disposed to one side of the housing 5 rather than directly beneath the spindle 11 as in the prior construction. This alternative construction is one in which, under some circumstances, the restraining rod 18 may be omitted since, when the spindle 11 is rotating it is substantially free of forces acting in the axial direction.

It will be understood that various alterations, modifications, and/or additions may be incorporated into the foregoing without departing from the scope of the invention as defined by the appended claims.

Having now described my invention, what I claim as new and desire to secure by Letters Patent is:

1. A balancing machine spindle mounting including: a housing; a spindle rotatably mounted on said housing and having a cantilevered end portion projecting beyond said housing to receive a workpiece to be balanced; a support base; flexible support means connecting said housing and base and including, at least three elongate support members which extend transverse to the axis of said spindle and are arranged in spaced side by side relationship, said support members being connected between said housing and base to provide column supports for said housing, and each said support member has sufficient low lateral stiffness to permit relatively free movement of said housing relative to said base in all directions within a plane extending transverse to said support members; and an elongate restraining member arranged substantially parallel to said spindle and having opposite end portions connected to said housing and base respectively so as to restrain said housing against endwise movement relative to said base in the axial direction of the spindle, and said restraining member having sufficiently low lateral stiffness to permit relatively free movement of said housing relative to said base in all other said directions within said plane.

2. A spindle mounting according to claim 1, further including transducer means arranged to respond to lateral movement of said spindle in said plane so as to provide a signal characteristic of the force urging said spindle laterally from a mean position.

3. A spindle mounting according to claim 2, wherein said transducer means is rigidly connected to said base and responds to said spindle lateral movement through reactor means connected to said housing.

4. A spindle mounting according to claim 3, wherein said transducer means includes two force transducers which are connected to said base so as to be spaced apart in the axial direction of said spindle, each said force transducer being located adjacent a respective opposite end of said housing, and said reactor means includes two reactor members, each of which is connected to a respective said force transducer.

5. A spindle mounting according to claim 4, wherein each said reactor member is elongate and has its opposite ends connected to a said force transducer and said housing respectively, each said reactor member has its axis substantially parallel to said plane and arranged transverse to said spindle axis, and each said reactor member has sufficiently low lateral stiffness to substantially limit said transducer response to those forces acting in said plane laterally of said spindle.

6. A spindle mounting according to claim 5, wherein said transducers are located on one side of said housing, and said reactor members are connected to the opposite side of said housing.

7. A spindle mounting according to claim 3, wherein said reactor means is connected to said housing through said support members.

8. A spindle mounting according to claim 4, wherein said spindle is rotatably mounted in two bearings spaced apart in the axial direction of said spindle and which are rigidly connected together through said housing, and each said transducer is arranged adjacent a respective said bearing.

9. A spindle mounting according to claim 1, wherein two pair of said support members are provided, each said pair being located adjacent a respective opposite end of said housing, and the support members of each said pair are located at respective opposite sides of said housing.

10. A spindle mounting according to claim 9, wherein the support members of each said pair are located substantially the same distance from the axis of said spindle, and said restraining member is arranged with its axis substantially midway between the support members of each said pair.

11. A spindle mounting according to claim 1, wherein each said support member has a portion of reduced cross-sectional size intermediate its ends, and said reduced portion is of circular cross-section and constitutes a substantial part of the length of the respective said support member.

12. A spindle mounting according to claim 1, wherein said restraining member is connected to said housing adjacent one end of the housing and is connected to said base adjacent the opposite end of said housing.

13. A balancing machine including: a main frame; a spindle housing connected to said main frame through flexible support means; a spindle rotatably mounted on said housing and having a cantilevered end portion projecting beyond said housing to receive a workpiece to be balanced; drive means connected to said spindle and being operative to cause rotation thereof; transducer means secured to said main frame and being responsive to movement of said housing relative to said frame to generate a signal characteristic of the force causing such movement; said flexible support means including at least three elongate support members which extend transverse to the axis of said spindle and are arranged in spaced side by side relationship, said support members being connected between said housing and main frame to provide column supports for said housing, and each said support member has sufficiently low lateral stiffness to permit relatively free movement of said housing relative to said main frame in all directions within a plane extending transverse to said support members; and an elongate restraining member arranged substantially parallel to said spindle and having opposite end portions connected to said housing and main frame respectively so as to restrain said housing against endwise movement relative to said main frame in the axial direction of the spindle, and said restraining member having sufficiently low lateral stiffness to permit relatively free movement of said housing relative to said main frame in all other said directions within said plane.

14. A balancing machine according to claim 13, wherein transducer means is connected to said main frame and arranged to respond to said housing lateral movement by generating a signal characteristic of the force urging said housing from a mean position, said transducer means including two force transducers which are connected to said main frame so as to be spaced apart in the axial direction of said spindle, each said force transducer being located adjacent a respective opposite end of said housing, and being connected to said housing through a respective reactor member.

15. A balancing machine according to claim 14, wherein each said reactor member is elongate and has its opposite ends connected to a said force transducer and said housing respectively, each said reactor member has its axis substantially parallel to said plane and arranged transverse to said spindle axis, and each said reactor member has sufficiently low lateral stiffness to substantially limit said transducer response to those forces acting in said plane laterally of said spindle.

16. A balancing machine according to claim 15, wherein said spindle is rotatably mounted in two bearings spaced apart in the axial direction of said spindle and which are rigidly connected together through said housing, and each said transducer is arranged adjacent a respective said bearing.

17. A balancing machine according to claim 13, wherein two pair of said support members are provided, each said pair being located adjacent a respective opposite end of said housing with the support members thereof located at respective opposite sides of said housing and at substantially the same distance from the spindle axis, and said restraining member is arranged with its axis substantially midway between the support members of each said pair.

* * * * *